(12) United States Patent
Liu

(10) Patent No.: US 7,111,973 B2
(45) Date of Patent: Sep. 26, 2006

(54) LIGHT DIRECTING STRUCTURE FOR A CONNECTOR

(75) Inventor: Lu-Ta Liu, Taipei (TW)

(73) Assignee: Lankom Electronics Co., Ltd., Taipei (TW)

( * ) Notice: Subject to any disclaimer, the term of this patent is extended or adjusted under 35 U.S.C. 154(b) by 280 days.

(21) Appl. No.: 10/775,308

(22) Filed: Feb. 10, 2004

(65) Prior Publication Data

US 2005/0174661 A1    Aug. 11, 2005

(51) Int. Cl.
*F21V 8/00*    (2006.01)

(52) U.S. Cl. ............... 362/581; 362/558; 362/555; 362/646; 362/659

(58) Field of Classification Search ........... 362/558, 362/560, 561, 555, 581, 433, 646, 652, 657, 362/658, 659, 640; 385/88, 89, 90, 91, 92, 385/93, 94
See application file for complete search history.

(56) References Cited

U.S. PATENT DOCUMENTS

| | | | |
|---|---|---|---|
| 5,938,324 A * | 8/1999 | Salmon et al. | 362/555 |
| 5,988,842 A * | 11/1999 | Johnsen et al. | 362/551 |
| 6,860,627 B1 * | 3/2005 | Hsieh | 362/551 |

* cited by examiner

*Primary Examiner*—Laura K. Tso
(74) *Attorney, Agent, or Firm*—Alan D. Kamrath; Nikolai & Mersereau, P.A.

(57) ABSTRACT

A light directing device for a connector includes a translucent tube having a slanted portion and a straight portion. The slanted portion has a perpendicular face adapted to be engaged with a side face of a light emitting diode. A reflection seat is adapted to be securely connected to the connector and having at least one pair of covering plates. Each pair of covering plates defines therebetween a gap for receiving therein the light emitting diode.

3 Claims, 7 Drawing Sheets

# LIGHT DIRECTING STRUCTURE FOR A CONNECTOR

BACKGROUND OF THE INVENTION

1. Field of the Invention

The present invention relates to a light directing structure, and more particularly to a light directing structure to redirect the light to different height without loss of brightness.

2. Description of Related Art

A conventional light directing device used in a connector normally includes a straight translucent tube with two ends and a light emitting diode (LED) securely attached to one end of the translucent tube. The other end of the translucent tube is then attached to a surface such that the light from the LED is able to be viewed from the outside of the surface. In general, this kind of light directing device is incorporated with an RJ45 connector which is used in a personal computer for connection with the INTERNET. Therefore, the user is able to observe the connection speed with the INTERNET by the flash of the LED. However, due to the limitation of the light transmission being linear, the position for installation of the light directing device in the PC is so limited that the designer has little room for application. Besides, the light from the LED is weakened due to light refraction and scattering effect such that the observed brightness of the light is not as bright as expected.

To overcome the shortcomings, the present invention tends to provide an improved light directing device to mitigate the aforementioned problems.

SUMMARY OF THE INVENTION

The primary objective of the present invention is to provide an improved light directing device to enable the light from the LED be redirected to different position from the position where the LED is installed such that the designer has large room available for application.

Another objective of the present invention is to provide a reflection seat to prevent brightness from loss during light transmission.

Other objects, advantages and novel features of the invention will become more apparent from the following detailed description when taken in conjunction with the accompanying drawings.

DETAILED DESCRIPTION OF THE PREFERRED EMBODIMENT

Figure 1:
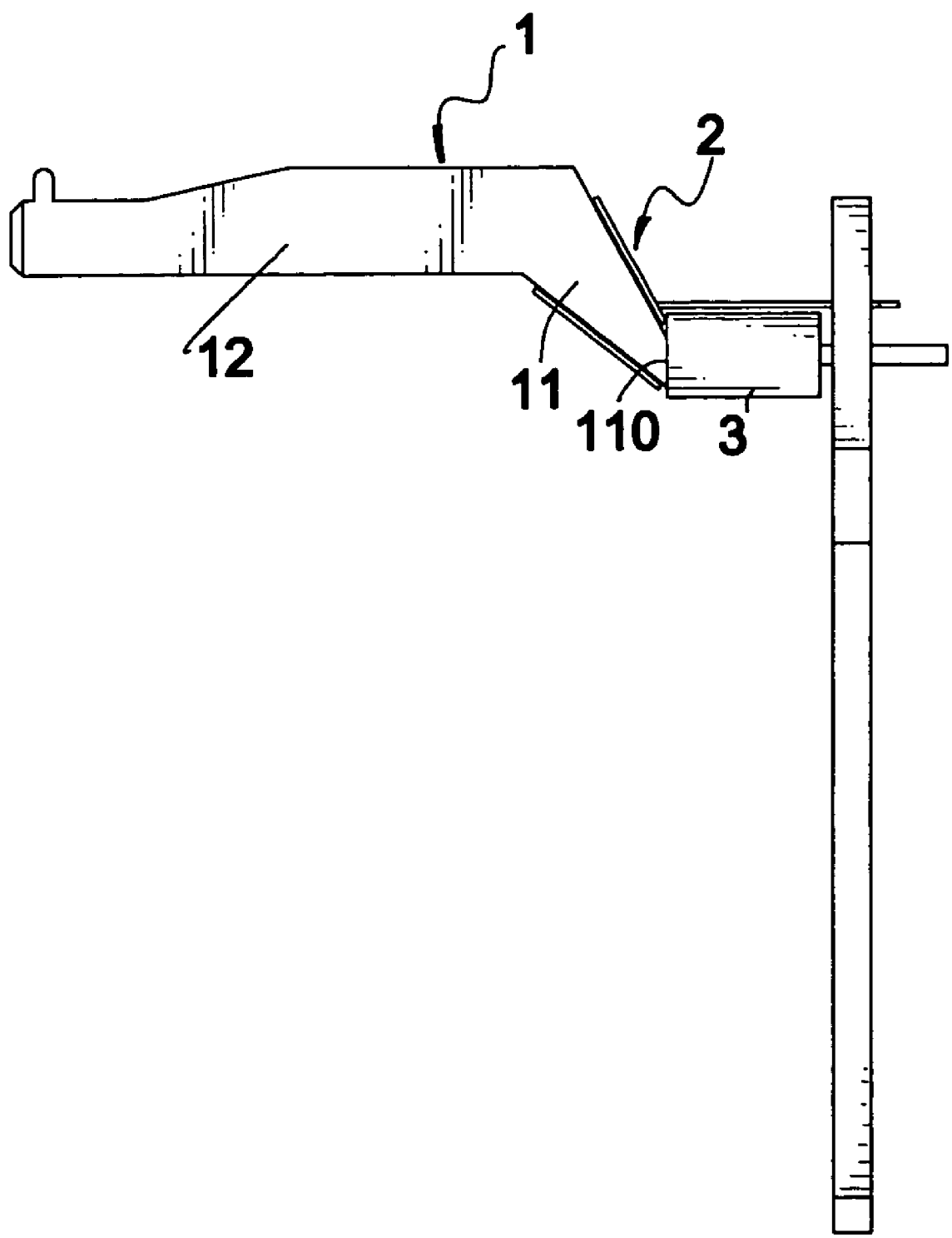
FIG. 1 is a side plan view showing schematically the application of the light directing device.

With reference to FIG. 1, the light directing device in accordance with the present invention includes a translucent tube (1) and a reflection seat (2).

The translucent tube (1) has a slanted portion (11) and a straight portion (12). The slanted portion (11) has a perpendicular face (110) in parallel to a surface of the light emitting diode (LED) (3).

Figure 2:
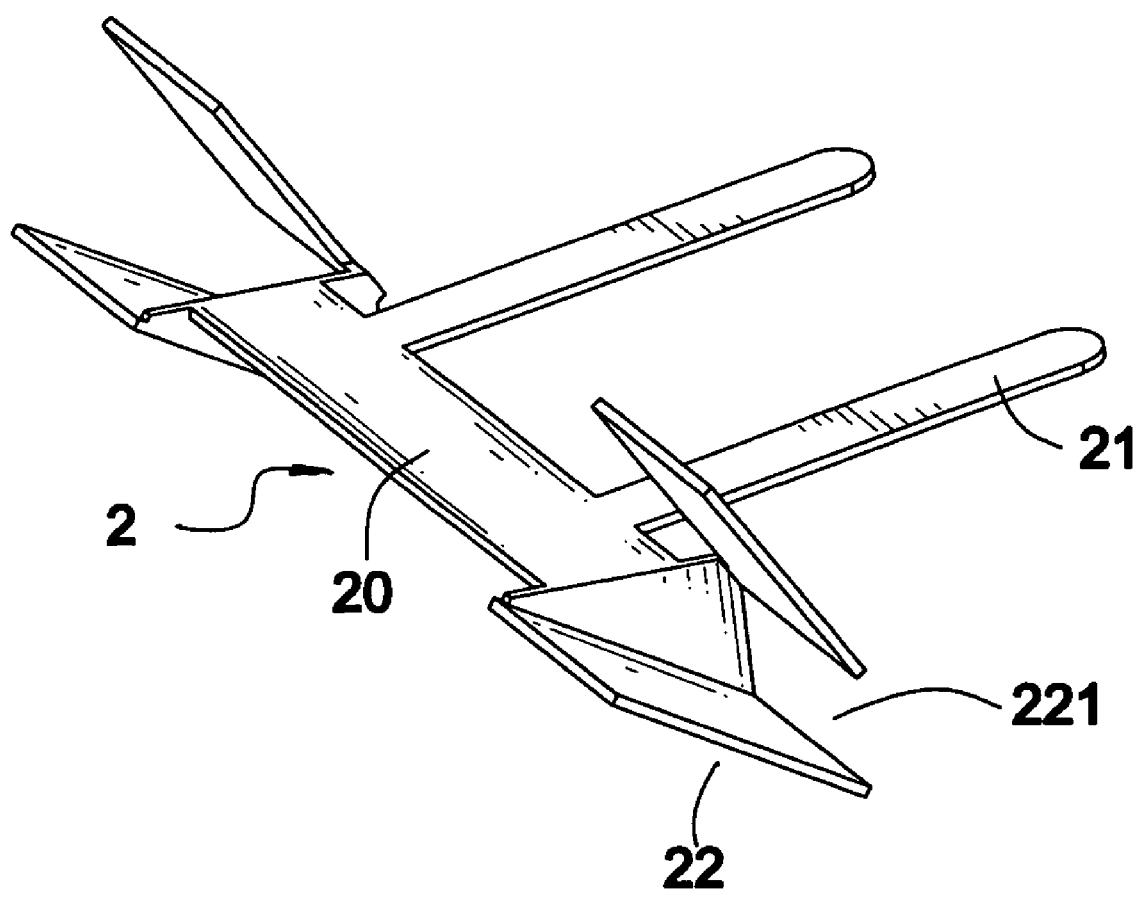
FIG. 2 is a perspective view of the reflection seat of the present invention.

With reference to FIG. 2, the reflection seat (2) has two extensions (21) extending from the body (20) of the reflection seat (2) and two pairs of covering plates (22) respectively formed on opposite side of the body (20). Each pair of covering plates (22) defines therebetween a gap (221).

Figure 3:
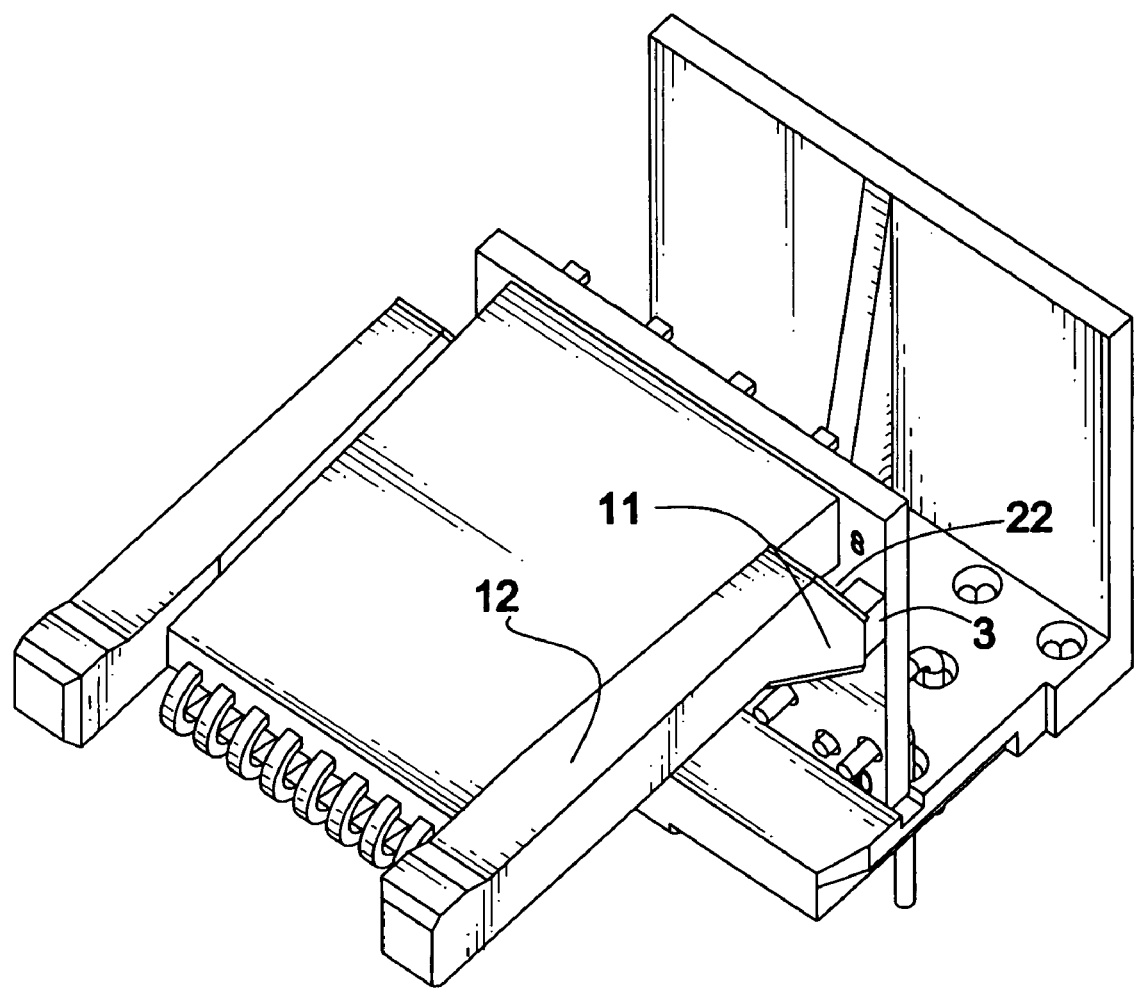
FIG. 3 is a schematic perspective view showing the application of the light directing device of the present invention.

With reference to FIG. 3 and sill considering FIG. 1 as a reference, it is noted that each pair of covering plates (22) is configured in such a way that the slanted portion (11) is able to be fitted between the pair of covering plates (22) and the two covering plates (22) are able to engage with two opposite sides of the slanted portion (11).

Figure 4:
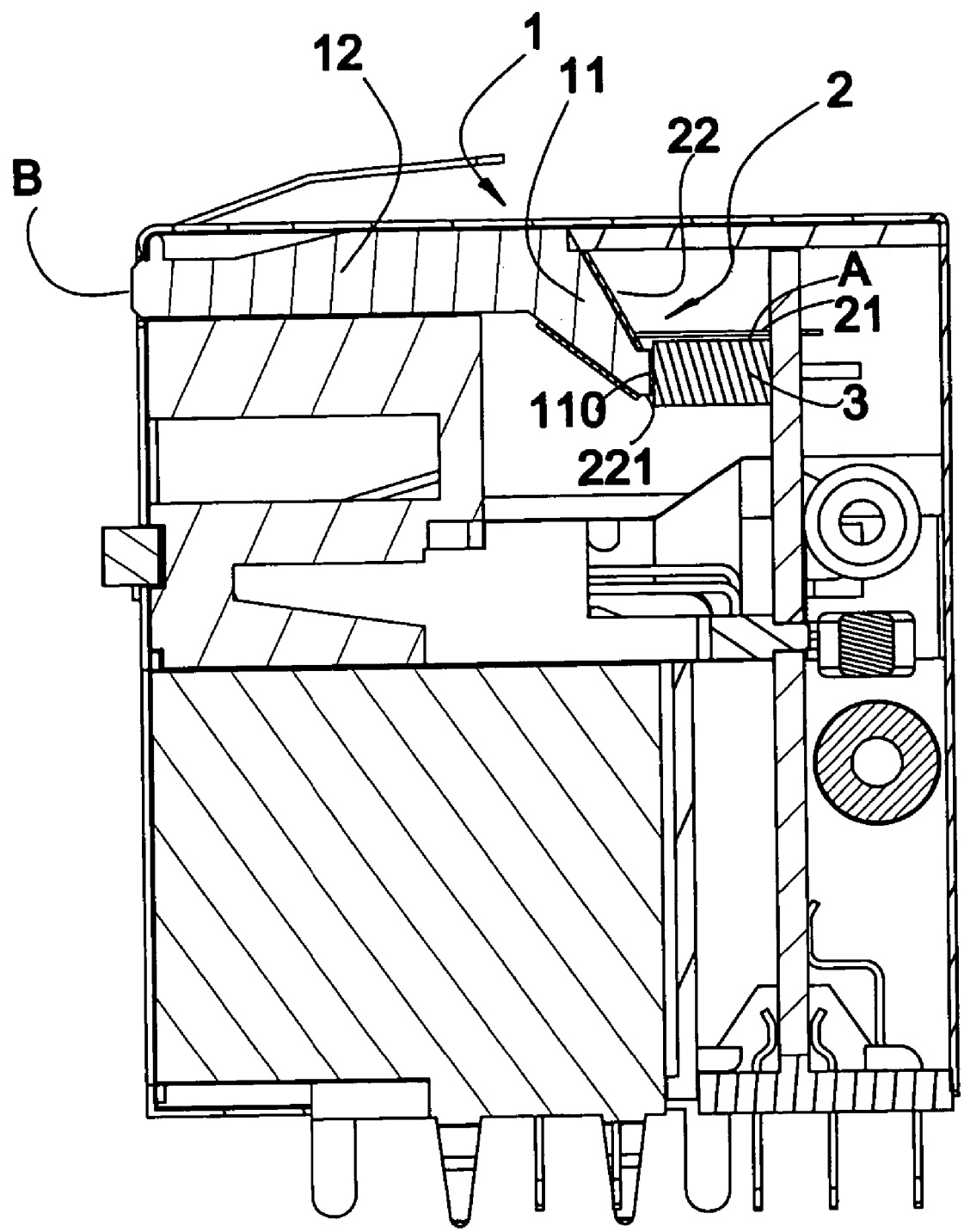
FIG. 4 is a schematic view in cross section, wherein the light directing device is able to redirect the light from the light emitting diode to a position different from a position where the LED is installed.
Figure 5:
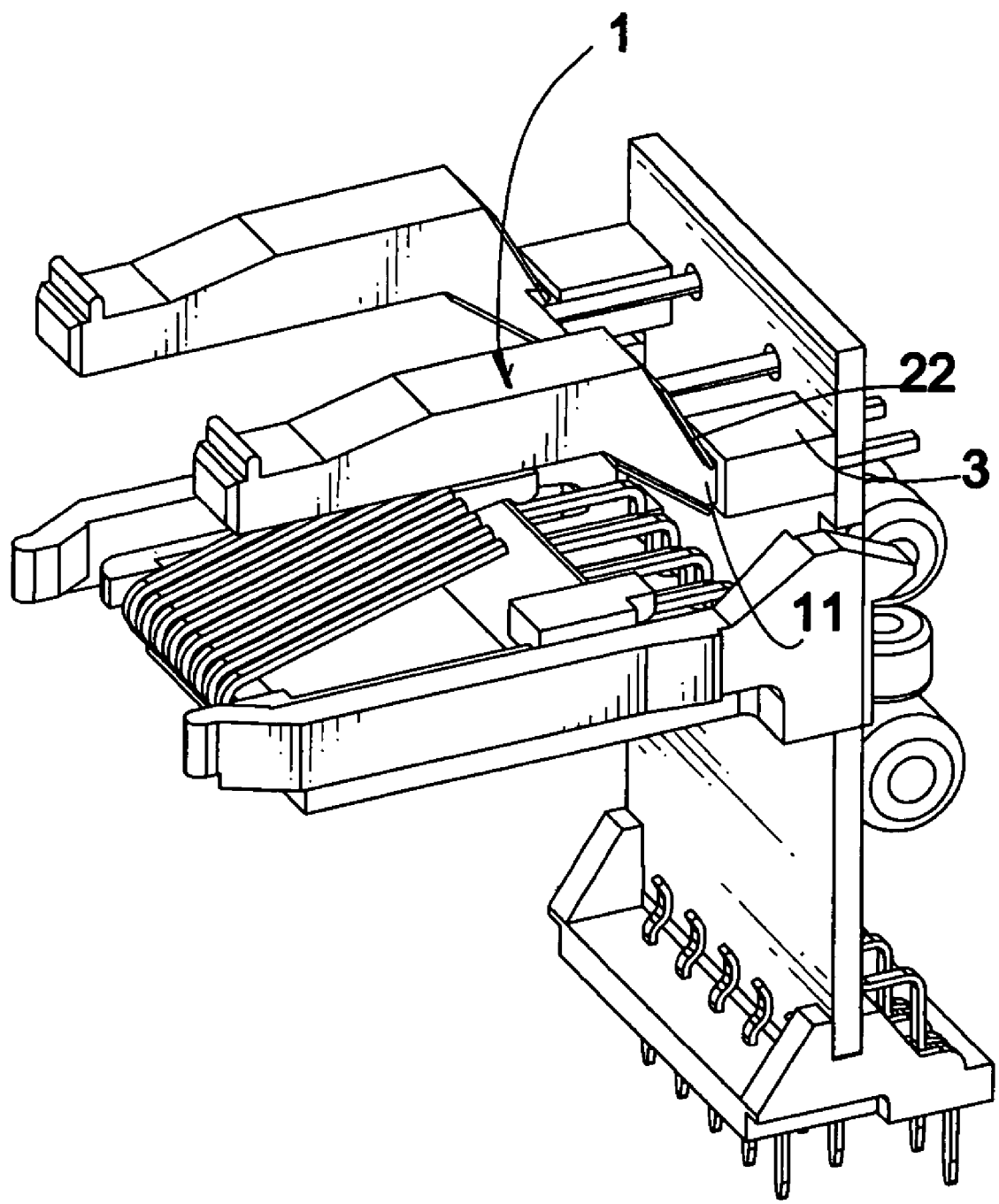
FIG. 5 is a perspective view showing that the light directing device is installed in a connector.

In order to have a better understanding of the advantage of the light directing device of the present invention, FIGS. 4 and 5 are now referenced to show the application of the light directing device.

When the light directing device of the present invention is incorporated with a connector having a LED (3) mounted on a wall at a first position with a first height in relation to the wall, the gap (221) is coincident with the LED (3) and thus the LED (3) is sandwiched between the two covering plates (22). The slanted portion (11) of the translucent tube (1) is fitted inside the two pairs of the covering plates (22) of the reflection seat (2) to have the perpendicular face (110) engaged with a side face of the LED (3).

Therefore, the user is able to display the light from the LED (3) to a position different from the position where the LED (3) is installed. It is to be noted that if the LED (3) is installed at a first position A with a first height, after the application of the light directing device to the connector i.e. RJ45 connector, as shown in FIGS. 4 and 5, and after the alignment between the gap (221) and the LED (3), the straight portion (12) is located at a second position B different from the first position A, whereas the second position B has a height different from the height of the first position A. Therefore, the designer is able to use the feature of the translucent tube (1) to redirect the light from the LED (3) to a different position in relation to the position the LED (3) is mounted.

Furthermore, with the two pairs of the covering plates (22) covering the two opposite sides of the translucent tube (1), the light from the LED (3) is able to be reflected totally to the straight portion (12) without any loss of brightness. Preferably, as a result, the covering plates (22) are provided with a paint (not shown) to reflect the light entirely.

Still further, the two extensions (21) are able to fix the reflection seat (2) onto the connector to secure the light transmission of the translucent tube (1) which is substantially clamped between the two pairs of covering plates (22).

Figure 6:
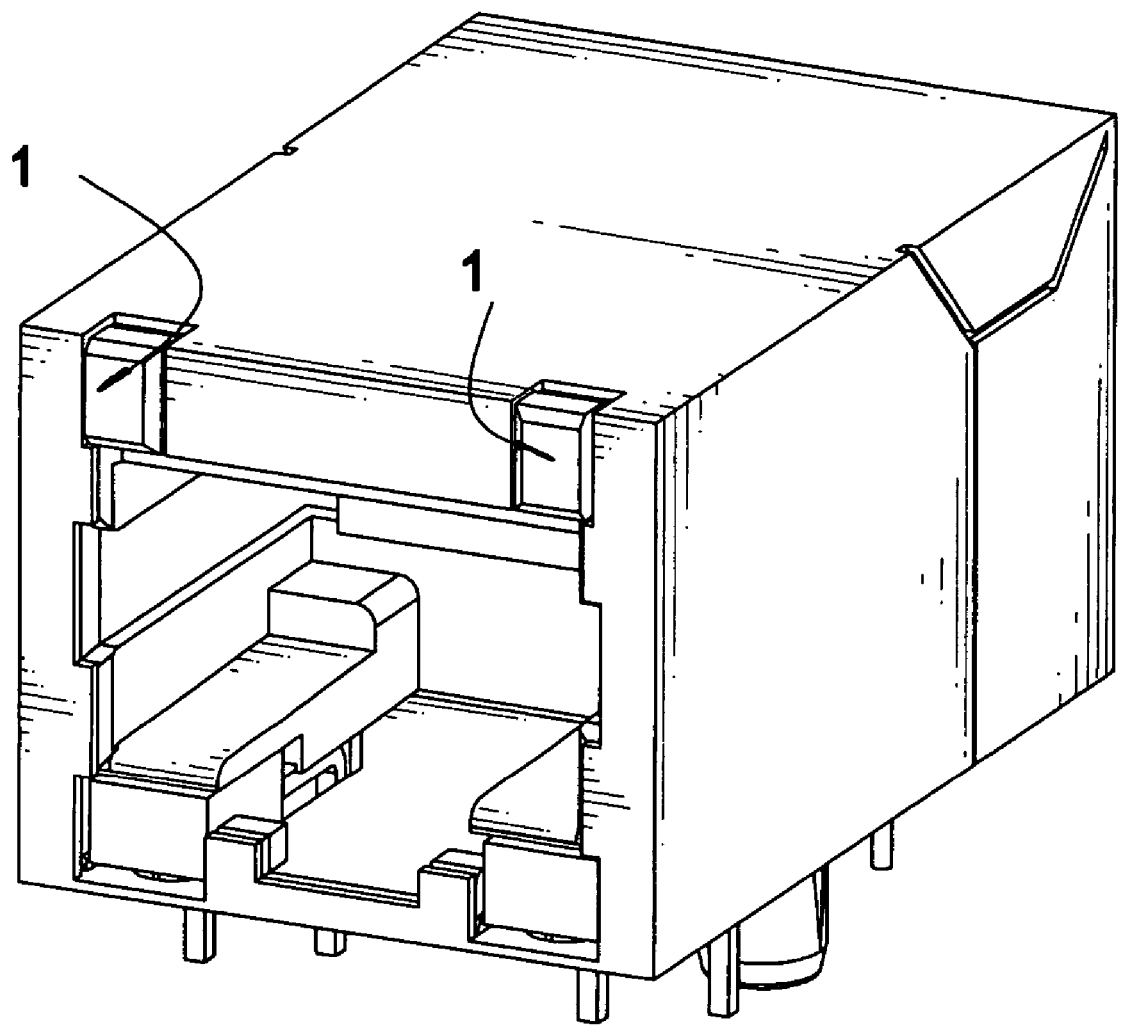
FIG. 6 is a schematic perspective view showing the application of the light directing device in a connector.
Figure 7:
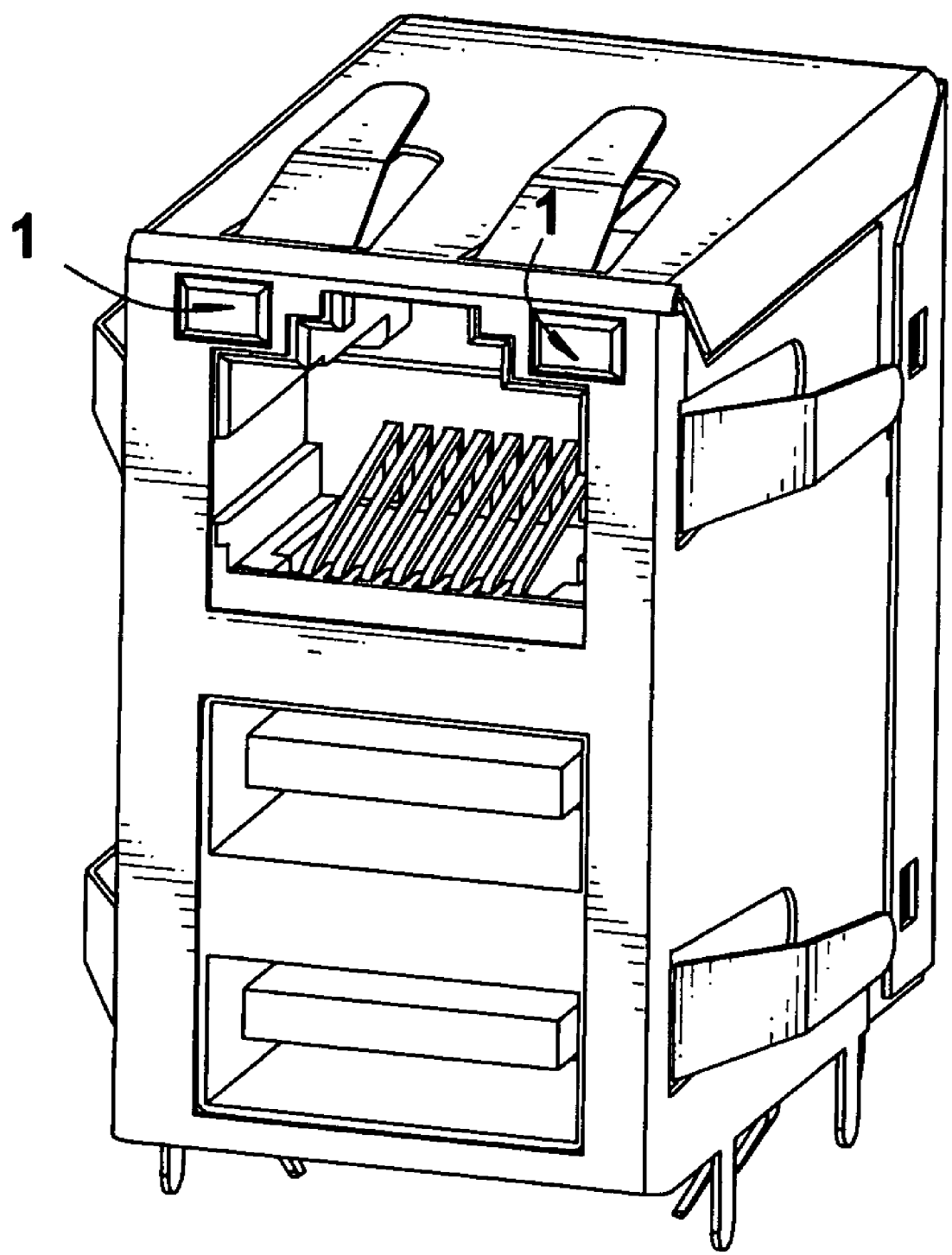
FIG. 7 is a schematic perspective view showing the application of the light directing device in a different connector.

With reference to FIGS. 6 and 7, it is noted that after the application of the present invention in the connector, the user is able to observe the working conditions of the connector by the flashing speed of the present invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light directing device for a connector, the light directing device comprising:
    a translucent tube having a slanted portion and a straight portion formed with the slanted portion, the slanted portion has a perpendicular face adapted to be engaged with a side face of a light emitting diode; and
    a reflection seat adapted to be securely connected to the connector and having at least one pair of covering plates, each pair of covering plates defining therebetween a gap for receiving therein the light emitting diode.

2. The light directing device as claimed in claim 1, wherein the reflection seat has two pairs of covering plates oppositely formed on either side of the reflection seat to respectively engage with opposite sides of the slanted portion of two translucent tubes whereby light from the two light emitting diodes is able to be reflected entirely.

3. The light directing device as claimed in claim 2, wherein the reflection seat has two extensions extending out for engagement with the connector.

* * * * *